United States Patent
Jensen et al.

(10) Patent No.: US 11,092,753 B2
(45) Date of Patent: Aug. 17, 2021

(54) OPTICAL REFLECTIVE FILTER DEVICES AND OPTICAL NETWORKS USING THE SAME

(71) Applicant: CORNING OPTICAL COMMUNICATIONS LLC, Hickory, NC (US)

(72) Inventors: Joseph Clinton Jensen, Lawndale, NC (US); Christopher Paul Lewallen, Hudson, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/242,568

(22) Filed: Jan. 8, 2019

(65) Prior Publication Data

US 2019/0137697 A1  May 9, 2019

Related U.S. Application Data

(63) Continuation of application No. PCT/US2017/042334, filed on Jul. 17, 2017.
(Continued)

(51) Int. Cl.
*G02B 6/38* (2006.01)
*G02B 6/02* (2006.01)

(52) U.S. Cl.
CPC ......... *G02B 6/3845* (2013.01); *G02B 6/3831* (2013.01); *G02B 6/3849* (2013.01);
(Continued)

(58) Field of Classification Search
CPC .. G02B 6/3845; G02B 6/3831; G02B 6/3849; G02B 6/3894; G02B 6/02209; G02B 6/3871; G02B 6/389
(Continued)

(56) References Cited

U.S. PATENT DOCUMENTS

| | | |
|---|---|---|
| 6,454,464 B1 | 9/2002 | Nolan |
| 6,579,014 B2 | 6/2003 | Melton et al. |

(Continued)

FOREIGN PATENT DOCUMENTS

| | | | |
|---|---|---|---|
| EP | 2264420 A1 | 12/2010 | |
| FR | 2897696 A1 * | 8/2007 | ............... G02B 6/43 |

(Continued)

OTHER PUBLICATIONS

International Search Report and Written Opinion of the International Searching Authority; PCT/US2017/042334; dated Oct. 12, 2017; 11 Pages; European Patent Office.
(Continued)

*Primary Examiner* — Jerry M Blevins
(74) *Attorney, Agent, or Firm* — Michael E. Carroll, Jr.

(57) ABSTRACT

Optical filter devices for providing a reflective event in an optical network are disclosed. In one embodiment, the optical filter device comprises an optical filter assembly for reflecting one or more preselected wavelengths and a housing. In one embodiment, the housing comprises a plug end and a receptacle end for optical connection into a link or connection node of an optical network. The housing comprises a passageway between the plug end and the receptacle end, and the plug end comprises a shroud with a single fiber connector footprint. At least a portion of the optical filter assembly is disposed within the passageway of the housing. The optical filter devices disclosed allow the network operator the flexibility to choose where to position a reflective location in the optical network along with the ability to move, add or change the reflective location as desired.

33 Claims, 15 Drawing Sheets

Related U.S. Application Data

(60) Provisional application No. 62/365,105, filed on Jul. 21, 2016.

(52) U.S. Cl.
CPC ........ *G02B 6/3894* (2013.01); *G02B 6/02209* (2013.01); *G02B 6/389* (2013.01); *G02B 6/3871* (2013.01)

(58) Field of Classification Search
USPC .......................................................... 385/76
See application file for complete search history.

(56) References Cited

U.S. PATENT DOCUMENTS

| | | |
|---|---|---|
| 7,090,406 B2 | 8/2006 | Melton et al. |
| 7,113,679 B2 | 9/2006 | Melton et al. |
| 7,330,624 B2 | 2/2008 | Isenhour et al. |
| 8,670,110 B2 | 3/2014 | Schillab et al. |
| 9,229,170 B1 | 1/2016 | Wang et al. |
| 2004/0017982 A1* | 1/2004 | Nakajima ............ G02B 6/266 385/78 |
| 2007/0217747 A1 | 9/2007 | Greub et al. |
| 2009/0148101 A1 | 6/2009 | Lu et al. |
| 2012/0063723 A1 | 3/2012 | Jenkins et al. |
| 2012/0195556 A1* | 8/2012 | Wang ................... G02B 6/3817 385/77 |
| 2015/0253513 A1 | 9/2015 | Stone et al. |
| 2017/0059785 A1* | 3/2017 | Smith .................. G02B 6/3821 |
| 2017/0254963 A1* | 9/2017 | Sparrowhawk ...... G02B 6/3849 |

FOREIGN PATENT DOCUMENTS

| | | | |
|---|---|---|---|
| GB | 2276468 A | * 9/1994 | ......... A61B 5/14557 |
| GB | 2276468 A | 9/1994 | |
| GB | 2276468 B | 7/1995 | |
| JP | 2005234191 A | 9/2005 | |

OTHER PUBLICATIONS

Corning OEM Solutions: From the Cloud to the Home, Fiber Optic Products for Equipment Manufacturers; Downloaded Feb. 17, 2019: 2 Pages https://www.afop.com/download/datasets/1396/FWDM%20Reflector.pdf.

European Patent Application No. 17745587.0 Communication pursuant to Article 94(3) EPC dated Dec. 8, 2020; 6 Pages; European Patent Office.

* cited by examiner

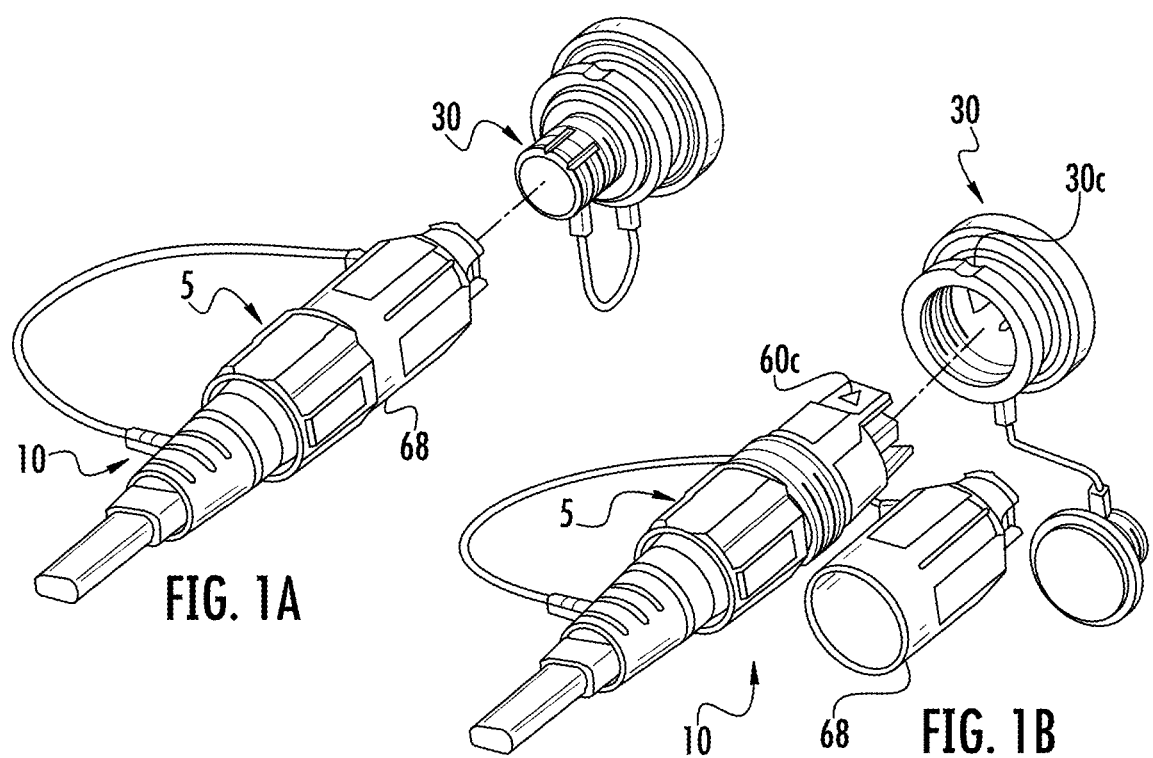
FIG. 1A
FIG. 1B
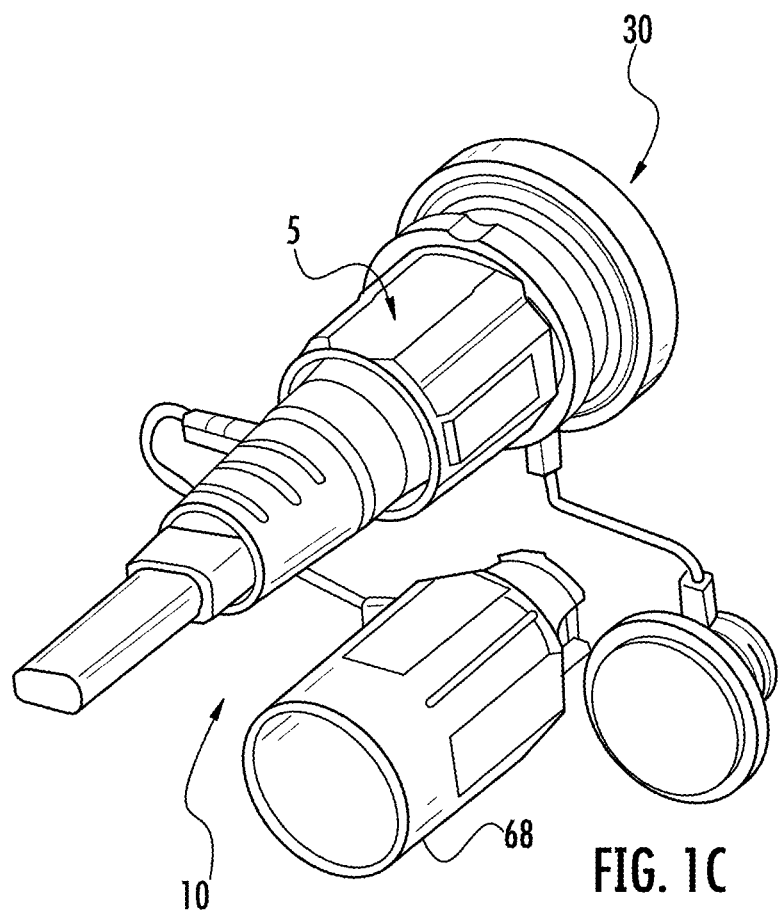
FIG. 1C

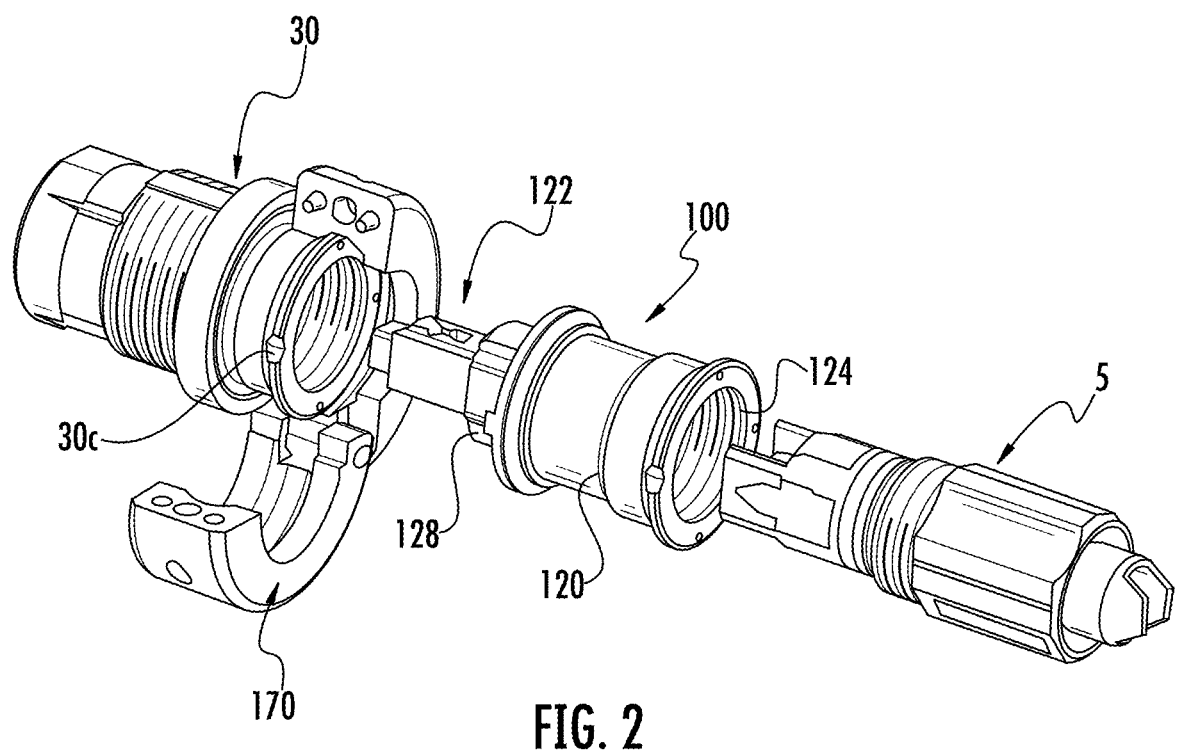
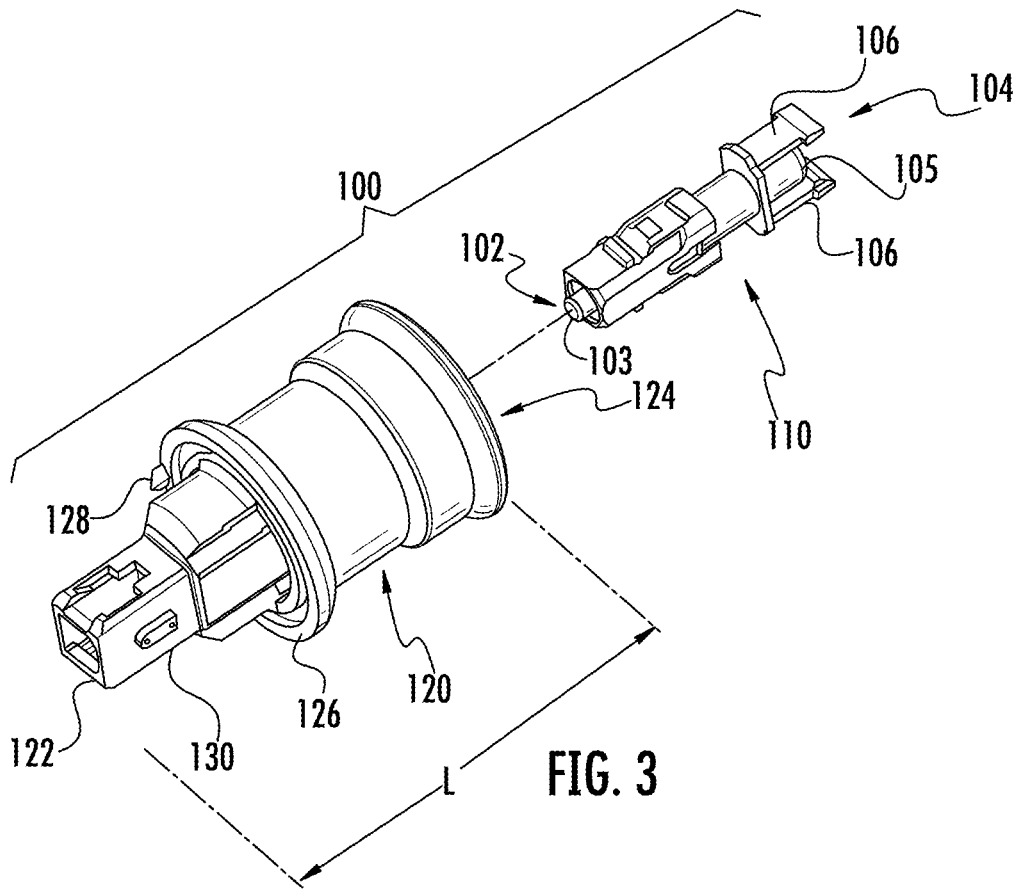

OPTICAL REFLECTIVE FILTER DEVICES AND OPTICAL NETWORKS USING THE SAME

PRIORITY APPLICATIONS

This application is a continuation of International Application No. PCT/US17/42334, filed on Jul. 17, 2017, which claims the benefit of priority to U.S. Application No. 62/365,105, filed on Jul. 21, 2016, both applications being incorporated herein by reference.

BACKGROUND

The disclosure is directed to optical reflective filter devices along with networks using the device. More specifically, the disclosure is directed to optical reflective filter devices that reflect specific optical wavelengths so the service providers have further versatility in monitoring and verifying links in their optical networks.

Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx and the like. To address this need for making optical connections in communication networks for the outside the plant environment hardened fiber optic connectors were developed. One of the most commercially successful hardened fiber optic connectors is the OptiTap® male plug connector sold by Corning Cable Systems, LLC of Hickory, N.C., such as disclosed in U.S. Pat. Nos. 7,090,406 and 7,113,679 (the '406 and '679 patents) and incorporated herein by reference. The Optitap® connector is a hardened male plug connector for terminating a cable that is configured for optical connection using a receptacle. As used herein, the term "hardened" describes a connector or receptacle port intended for making an environmentally sealed optical connection suitable for outdoor use, and the term "non-hardened" describes a connector or receptacle port that is not intended for making an environmentally sealed optical connection such as a SC connector.

In order for the service providers to monitor and verify links in optical networks there have been reflective devices that have been incorporated in connectors. As an example, optical connectors have used dust caps with a reflector in the dust cap to monitor the optical network. The reflective device in the dust cap returns a portion of the optical signal back through the optical fiber back to the central office or head end to determine if the optical link is continuous. However, this type of reflective device in a dust cap is only operational when the dust cap is installed on the connector and is not operational when the dust cap is removed from the connector. Consequently, the device is rendered useless when the connector is in a mated condition.

FIGS. 1A-1C are prior art depictions showing various stages of mating of a preconnectorized cable 10 having a plug connector 5 such as an OptiTap® connector with a receptacle 30. Receptacle 30 mates plug connector 5 with a standard SC connector (i.e., a non-hardened connector) at a second end (not visible in these views) using an adapter sleeve for aligning ferrules when mating plug connector 5 with the a non-hardened connector. Protection of the non-hardened connector side of the receptacle is typically accomplished by mounting the receptacle 30 through a wall of an enclosure or the like so that the non-hardened end of the receptacle is disposed inside the enclosure for environmental protection of the non-hardened connector. As shown by FIGS. 1A-1C, the other end of the receptacle 30 is accessible for receiving the plug connector 5 at the wall of the enclosure. Other applications may mount the receptacle 30 inside an enclosure on a bracket or the like.

Receptacle 30 allows an optical connection between the hardened connector such as the OptiTap® male plug connector with a non-hardened connector such as the SC connector at nodes in the optical network that typically transition from an outdoor space to an indoor space. Receptacle 30 is described in further detail in U.S. Pat. No. 6,579,014, which is incorporated herein by reference. As depicted, receptacle 30 includes a receptacle housing 12 and an adapter sleeve 18 disposed therein. The receptacle 30 receives a non-hardened connector at a second end 16 as represented by the arrow pointing to the left Network operators often desire to optically test a link in an optical network to verify service (e.g., troubleshoot) when a connector is in a mated condition. Testing when the connector when in the mated condition may be difficult for the network operator and may requires a technician to test the link at the connector location in the optical network, which is expensive and time-consuming to send a technician into the field for testing. Consequently, there exists an unresolved need for fiber optic devices that allow flexibility for the network operators to quickly and easily monitor and test links in their optical network.

SUMMARY

The disclosure is directed to an optical filter device comprising an optical filter assembly for reflecting one or more preselected wavelengths and a housing. The housing comprising a plug end and a receptacle end, and a passageway between the plug end and the receptacle end. The plug end comprises a shroud with a single fiber connector footprint, wherein the at least a portion of the optical filter assembly is disposed within the passageway of the housing. Thus, the concepts also allow a compact footprint for an optical filter device that can be installed into a connector node location in the field.

The disclosure is also directed to an optical filter device comprising an optical filter assembly for reflecting one or more preselected wavelengths and a housing. The optical filter assembly comprising a first end with a first ferrule end face and a second end with a second ferrule end face. The housing comprising a plug end and a receptacle end, and a passageway between the plug end and the receptacle end. The plug end comprises a shroud with a single fiber connector footprint, wherein at least a portion of the optical filter assembly is disposed within the passageway of the housing and the first end of the optical filter assembly extends beyond the shroud.

The disclosure is also directed to an optical filter device comprising an optical filter assembly for reflecting one or more preselected wavelengths and a housing. The optical filter assembly comprising a first end with a first ferrule end face and a second end with a second ferrule end face. The housing comprising a plug end and a receptacle end, and a passageway between the plug end and the receptacle end. The plug end comprises a shroud with a single fiber connector footprint and a rim disposed between the plug end and the receptacle end, and the rim comprising a key. At least a portion of the optical filter assembly is disposed within the passageway of the housing and the first end of the optical filter assembly extends beyond the shroud. Collars and other securing structures are also disclosed for use with the optical filter devices disclosed herein.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 1A-1C are prior art depictions showing various stages of mating of a preconnectorized cable having a plug connector with a receptacle;

FIG. 2 shows an environmental perspective view of an optical filter device disclosed herein aligned for coupling between a connector such as an male plug connector being inserted from the right and being aligned for insertion to a conventional receptacle on the left for creating a reflective event location in the optical network;

FIG. 3 is a partially exploded view of the optical filter device of FIG. 2 depicting the optical filter assembly and the housing;

DETAILED DESCRIPTION

Figure 4:
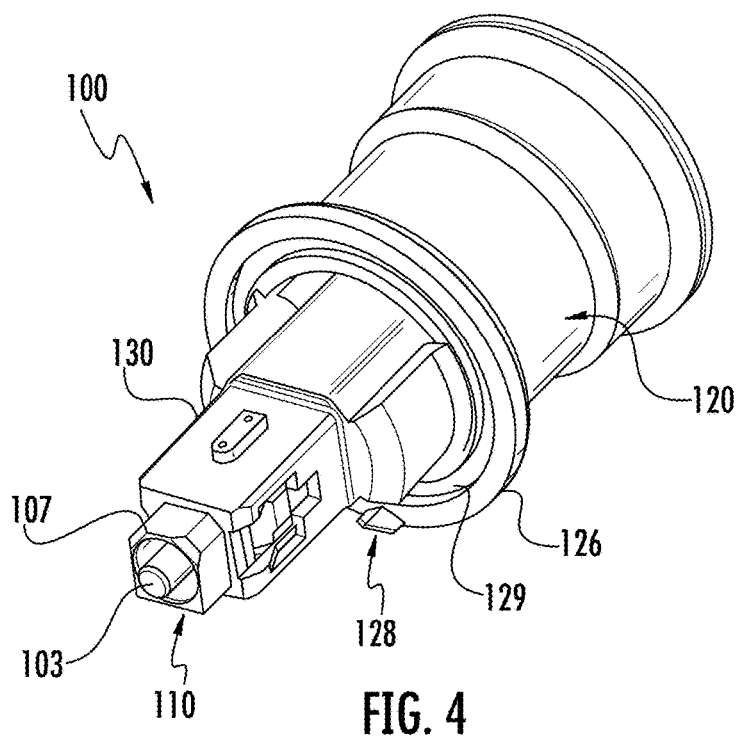
FIG. 4 is a front perspective view of the optical filter device of FIG. 2.

Reference will now be made in detail to the embodiments of the disclosure, examples of which are illustrated in the accompanying drawings. Whenever possible, like reference numbers will be used to refer to like components or parts.

The concepts for the optical filter devices described herein are suitable for creating optical reflective events at one or more predetermined wavelengths using an optical filter assembly. Although, the optical filter devices disclosed are first explained and depicted for mating between a hardened plug connector and a receptacle the concepts may be used with other types of form-factors like connector-to-connector matings as shown in later embodiments. The concepts disclosed advantageously allow the placement of robust and reliable optical filter devices at connection nodes of an optical network in a removable, replaceable and scalable manner. The disclosed optical filter devices are useful for testing an optical network by sending an optical signal from the central office to a network location having the optical filter device and having an optical reflection return to the central office if the optical link is continuous.

Some of the concepts disclosed herein are explained with respect to well-known commercial solutions for Fiber-to-the=Home applications, but are equally applicable to other connector solutions. Specifically, the first two embodiments are devices directed for use with an OptiTap® connector and receptacle, but the concepts disclosed herein may be used with other fiber optic connectors hardened or not and are not limited to this particular optical connection. By way of explanatory example, a third embodiment suitable for use with another connector form-factor is also disclosed.

FIGS. 1-8 are directed to a first embodiment of an optical filter device 100 for explaining the concepts disclosed herein. FIG. 2 shows an environmental perspective view of optical filter device 100 disclosed herein and FIG. 3 is a partially exploded view of the optical filter device 100 showing the optical filter assembly 110 and housing 120. As shown in FIG. 2, the housing 120 of optical filter device 100 comprises a plug end 122 and a receptacle end 124 useful for being optically coupled at a connection node between a hardened connector such as plug connector 5 and receptacle 30. Specifically, optical filter device 100 is useful for having plug connector 5 being aligned and inserted from the right into the receptacle end 124 of device 100 for optical connectivity and the plug end 122 of device 100 is aligned with the passageway of the receptacle 30 on the left for insertion and optical connectivity at that end. Thus, optical filter device creates a reflective event location in the optical network at the connection node. Moreover, the optical filter device 100 may be moved, added, replaced at the connection node as desired by the network operator.

In this embodiment, the plug end 122 comprises a shroud 130 having a single fiber connector footprint, but other connector footprints according to the concepts disclosed are possible. Also shown in FIG. 2 is a collar 170 used for securing optical filter device 100 to receptacle 30 depicted in an open state. However, other structures for securing optical filter device 100 to receptacle 30 are possible such as disclosed herein.

Optical filter assembly 110 reflects one or more preselected optical wavelengths and allows other optical wavelengths to pass. The preselected wavelengths that pass could having any suitable pass band required by the service provider. By way of non-limiting example, the optical filter assembly 110 may be suitable for passing 1310 nanometers (nm) and 1550 nm wavelength ranges and reflecting wavelengths in the 1625 nm range. Consequently, the service operator can test the optical link to the connection node having optical filter device 100 using a wavelength in the 1625 nm range that reflects back. Optical filter device 100 may reflect one or more predetermined wavelengths by using any suitable structure such as a Bragg grating on an optical waveguide of the device.

As best shown in FIG. 3, optical filter assembly 110 comprises a first end 102 comprising a first ferrule end face 103 and a second end 104 comprising a second ferrule end face 105. The first end of optical filter assembly 110 has a predetermined connector footprint. As depicted, optical filter assembly 110 has a SC connector footprint; but other suitable connector footprints are possible such as LC with the concepts disclosed.

Optical filter assembly 110 also comprises an optional latch structure 106 disposed at the second end 104 for securing the mating of the plug connector 5. In this instance, latch structure 106 comprises one or more cantilevered arms (not numbered) that are deflectable with ramps having latching fingers (not numbered). As depicted, the second ferrule end face 105 is disposed between the cantilevered arms and recessed from the end of the latch structure 106. When assembled, at least a portion of the optical filter assembly 110 is disposed within a passageway of the housing 100. As best depicted in FIG. 4, a portion of the first end 102 of optical filter assembly 110 extends beyond the housing 100. In this embodiment, the single fiber connector footprint of the shroud 130 has a SC connector footprint and the first end 102 of the optical filter assembly 100 extends beyond the shroud 130.

Housings of optical filter devices may be formed from one or more components depending on the design and requirements for the device. In this particular embodiment, housing 120 is monolithically formed; however, other embodiments could have designs where the housings were formed from a plurality of components. Housing having a plurality of components could be assembled by snap-fitting, adhesive, welding or the like. Housing 120 may comprise one or more features for alignment during mating and may also comprise other features for securing the device. Likewise, housing has a relatively small footprint such as having a length L of about 40 millimeters or less.

As depicted housing 120 comprises a rim 126 disposed between plug end 122 and receptacle end 124. A key 128 is formed on the rim 126. Key 128 has a predetermined location with respect to an orientation of shroud 130 of housing 120 for aligning the connector footprint on the plug end 122 of optical filter device 100. Specifically, optical filter assembly 110 is received into the housing 120 so that the correct orientation between optical filter assembly 110 and shroud 130 is maintained. As best depicted in FIG. 4, key 128 is disposed opposite a chamfered end 107 of the optical filter assembly for the SC connector footprint.

Figure 5:
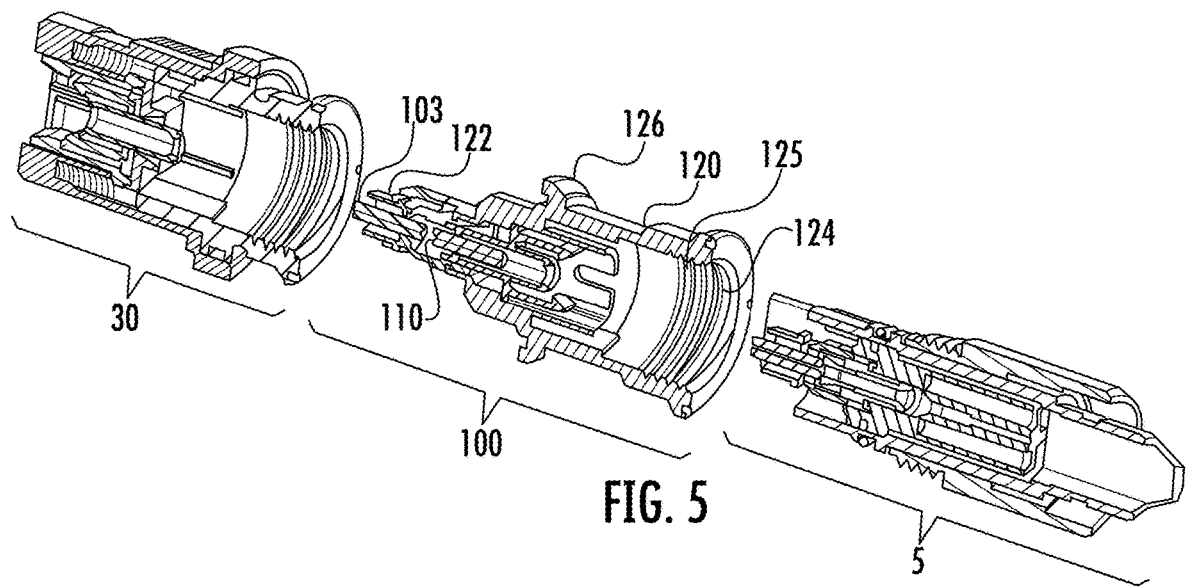
FIG. 5 is a cross-sectional view of the components of FIG. 2 in the unmated condition with the collar removed for clarity.
Figures 6, 7:
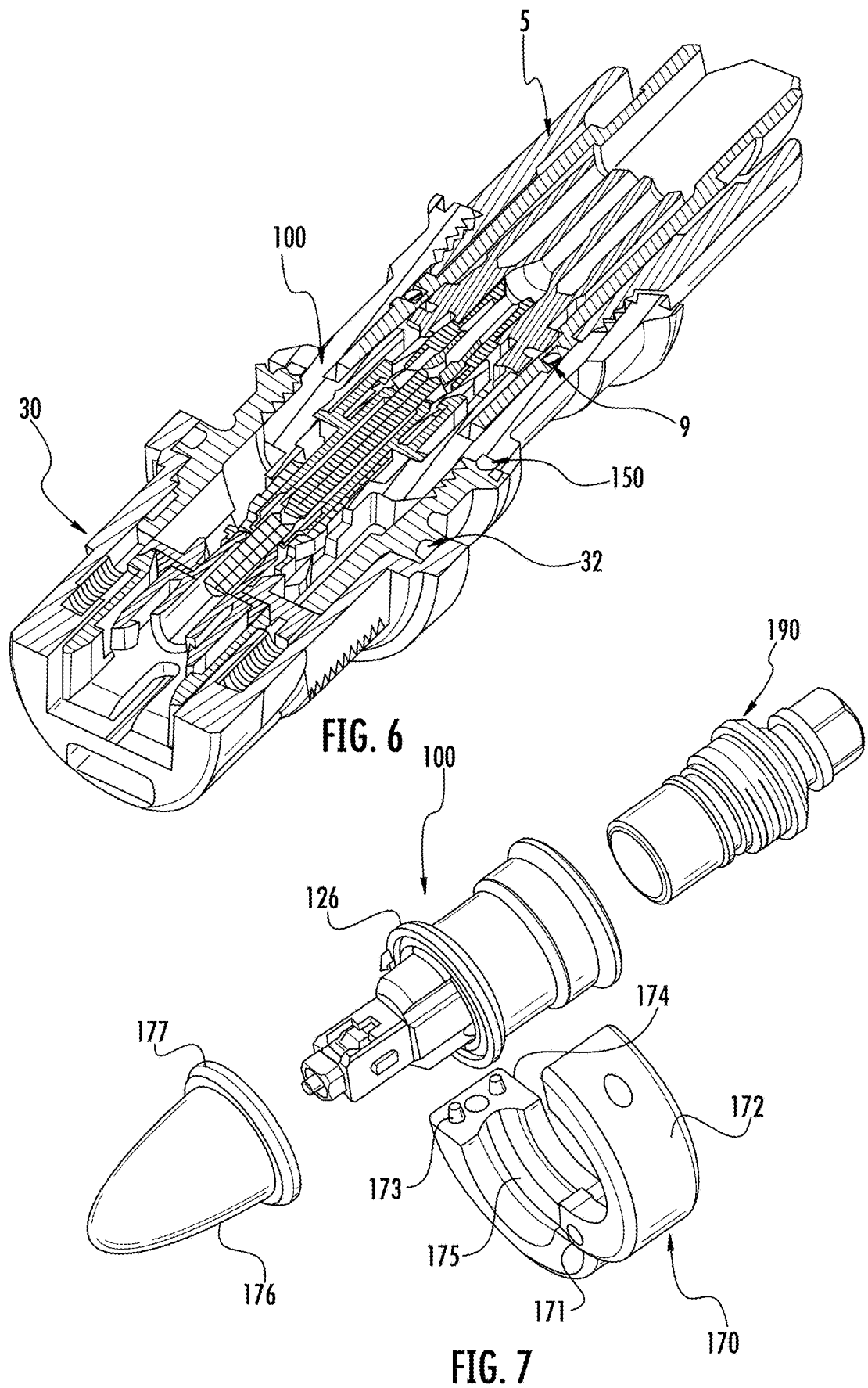
FIG. 6 is a cross-sectional views of components of FIG. 2 in a mated condition with the collar is removed for clarity.
FIG. 7 is a perspective view showing the optical filter device along with dust caps and a collar.

FIG. 2 shows that key 128 aligns with indicia 30c of receptacle 30. In this embodiment, key 128 comprises a protruding V-shape. In other words, key 128 extends toward the plug end 122 of the housing 120 forward of the rim 126. The protruding V-shape will only cooperate with the notched portion of indicia 30c for full insertion and optical connectivity. Consequently, optical filter device can only be fully-inserted and mate with receptacle 30 in the correct orientation. and would not assembly FIGS. 5 and 6 respectively are cross-sectional views of the optical filter device 100 in the unmated condition and the mated condition with the collar 170 removed for clarity in both views. As best depicted in FIG. 5, the receptacle end 124 of the passageway of housing 120 has internal threads 125 for securing the plug connector 5. Specifically, the coupling nut (not numbered) of plug connector 5 can be inserted into the receptacle end of optical filter device 100 for threadly securing the plug connector 5 to the optical filter device 100 as shown in FIG. 6. Optical filter device 100 may also comprise one or more O-rings for sealing. FIG. 6 shows an O-ring 150 disposed within a groove 129 of housing 120 (FIG. 4). As depicted; receptacle 30 can also include one or more O-rings 32 and plug connector 5 may also include one or more O-rings 9 for sealing the mated connection. Consequently, the optical filter device depicted in FIG. 6 is suitable for hardened applications (i.e., outdoor applications); however, the devices disclosed may be used in any suitable environment.

Figure 8:
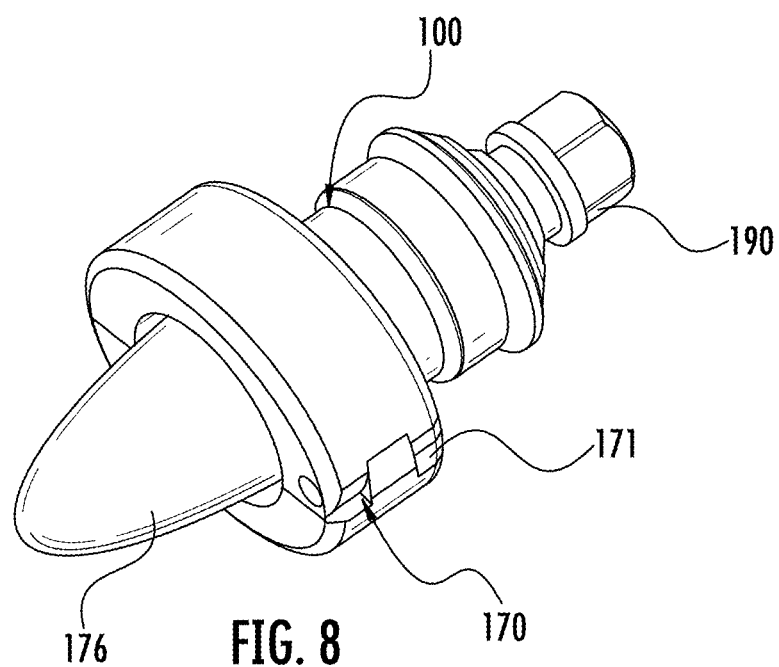
FIG. 8 is a perspective view showing the optical filter device with the collar and dust caps attached.

FIG. 7 is a perspective view showing optical filter device 100 along with a plug end dust cap 176 and a receptacle end dust cap 190. Plug end dust cap 176 has a rim 177 that cooperates with groove 175 of collar 170. In this particular embodiment; the collar 170 engages rim 126 of optical filter device 100 for securing to receptacle 30 and for securing plug end dust cap 176. In other words, the groove 175 of collar 170 holds the respective pressed together rims of receptacle 30 and the rim 126 of optical filter device 100 for securing the mated connection. Likewise, when not mated the collar 170 can hold together the pressed together the rim 177 of the plug end dust cap 176 to the rim 126 of the optical filter device 100. Collar 170 is a two-piece design having a first portion 172 and a second portion 174 with a hinge 171 that is created when the parts are assembled. Collar 170 may also include securing features 173 on the ends opposite end of hinge 171 for snapping the collar 170 together. FIG. 8 is a perspective view showing the optical filter device 100 with the collar 170 and dust caps 176 and 190 attached for preventing dirt or debris from contaminating the optical filter device.

Other concepts according to the concepts disclosed are possible. FIGS. 9-16 depict a second embodiment directed to optical filter device 200 for explaining the concepts disclosed herein. Optical filter device 200 comprises the optical filter device 100 with optical filter assembly 110 and housing 120 as explained herein, but further includes another type of securing structure for creating optical filter device 200.

Figure 9:
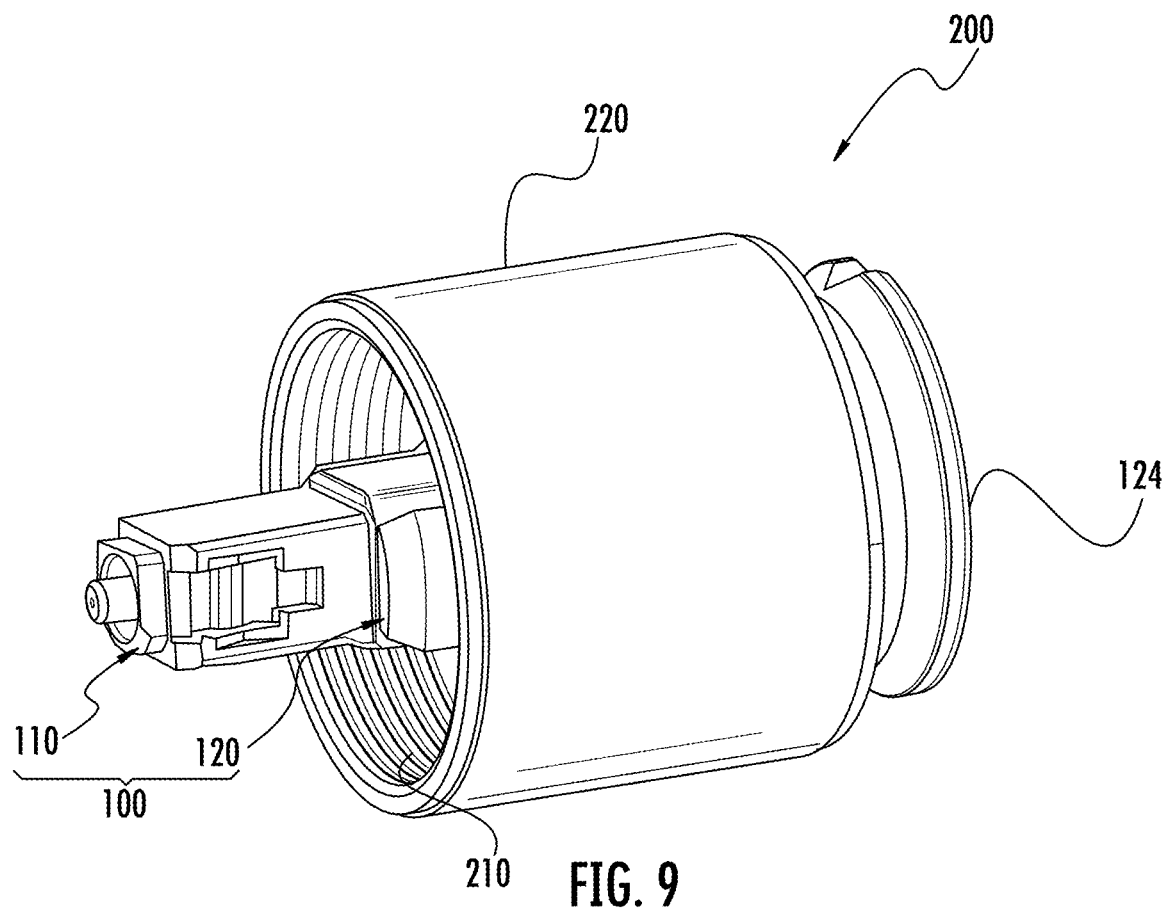
FIG. 9 is a perspective view of another optical filter device having a threaded collar according to the concepts disclosed herein.
Figure 10:
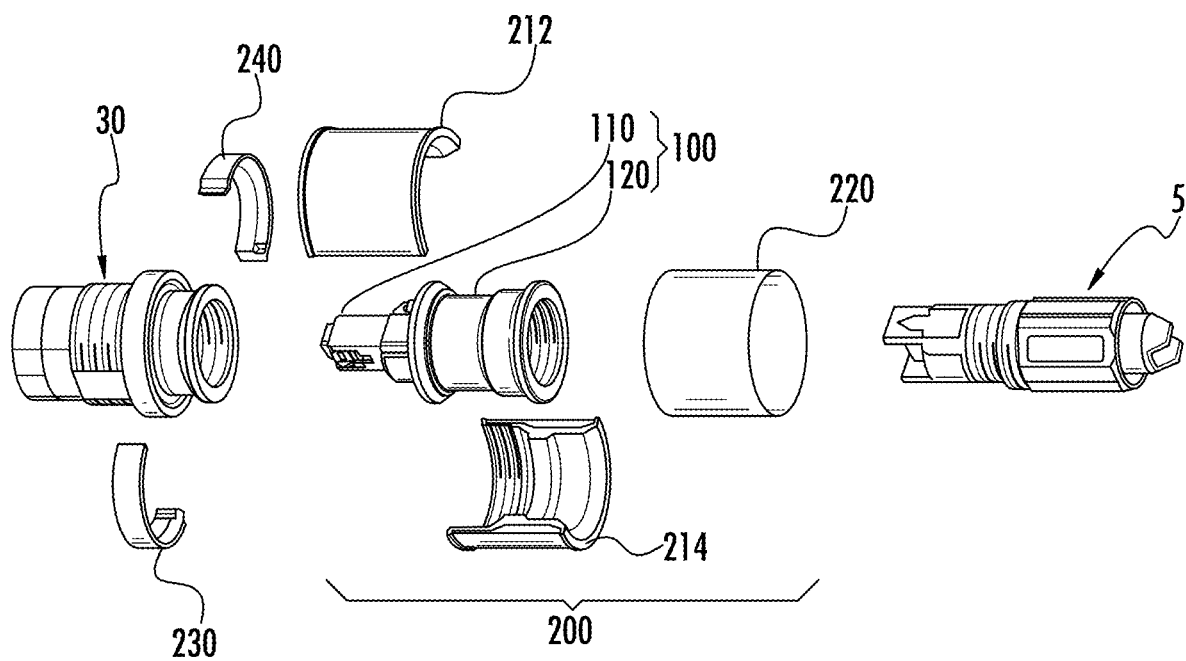
FIG. 10 shows an environmental view of the partially optical filter device of FIG. 9 along with a connector on the right-side and a conventional receptacle on the left-side.

FIG. 9 is a perspective view of optical filter device 200 comprising a threaded collar 210 and a retention sleeve 220 that can rotate as an assembly relative to the housing 120 of the optical fiber device 100 according to the concepts disclosed herein. Consequently, the optical filter device can be threadly attached with a modified receptacle 30. FIG. 10 shows an environmental view of the partially exploded optical fiber device 200 with the plug connector 5 on the right-side and the receptacle 30 on the left-side.

Figure 11:
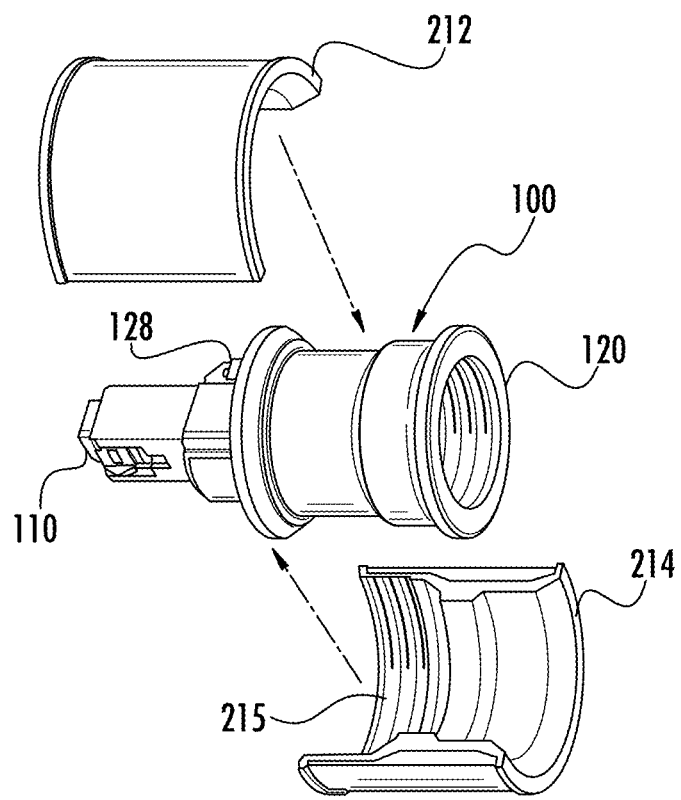
FIG. 11 is a partially exploded detailed view of the optical filter device of FIG. 9 before installing the threaded collar.
Figure 12:
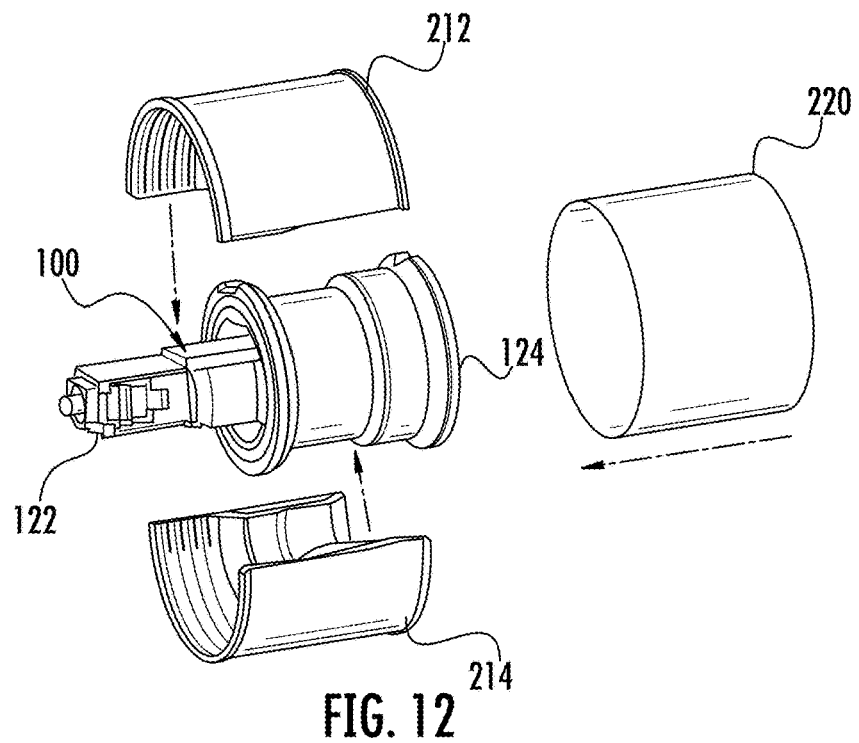
FIG. 12 is a partially exploded detailed view of the optical filter device of FIG. 9 showing a retention sleeve for securing the threaded collar.
Figure 13:
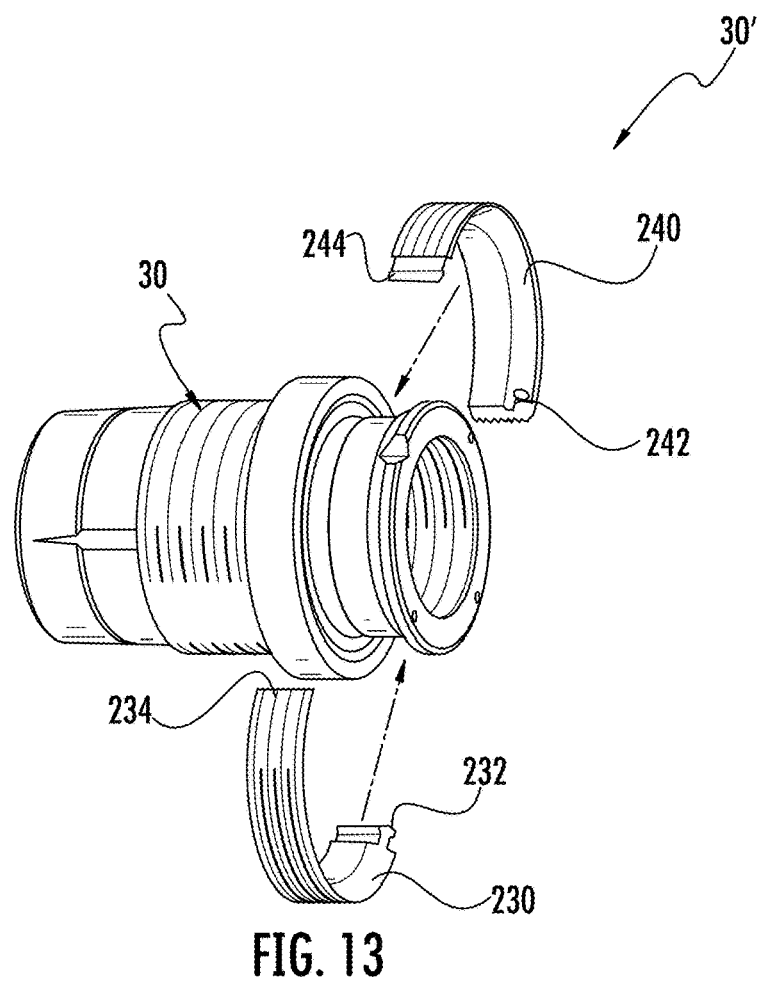
FIG. 13 is a partially exploded view of the conventional receptacle of FIG. 10 being retro-fitting with an external coupling device.
Figure 14:
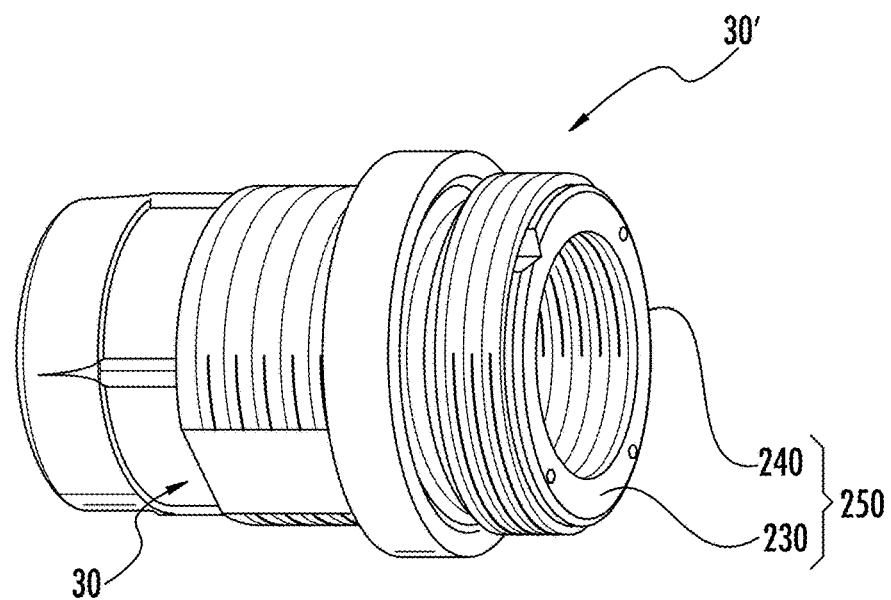
FIG. 14 is a perspective view of the conventional receptacle of FIG. 13 being retro-fitted with an external coupling device.

FIGS. 11 and 12 are partially exploded detailed views showing the details for constructing the optical filter device 200 about optical filter device 100. FIG. 9 shows the threaded collar 210 explode about optical filter device 100. As depicted, threaded collar 210 comprises two-pieces that fit about and are disposed over a portion of housing 120 from either side as represented by the arrows. A first piece 212 cooperates with a second piece 214 so snugly fit about the housing 120 while still being able to rotate once attached. First and second pieces 212, 214 have internal threads 215 that cooperate when mated. Thereafter, the retention sleeve 220 can be slid over the first and second pieces as represented by the horizontal arrow in FIG. 12. before installing the threaded collar;

FIGS. 13 and 14 respectively are a partially exploded view of receptacle 30' that is retro-fitted with an external threaded coupling structure 250 and the modified receptacle 30'. Receptacle 30 is originally intended to mate with plug connector 5 using its internal threads. In order to make receptacle 30 compatible with optical filter device 200 an external threaded coupling structure 250 is required. External threaded coupling structure 250 comprises a first portion 230 and a second portion 240 that cooperate to form an external threaded portion as shown. First portion 230 comprises attachment features 232, 234 that cooperate with the attachment features 242, 244 on second portion 240. Any suitable attachment features are possible for making a secure attachment between the first portion 230 and the second portion 240.

Additionally, after modification the receptacle 30' is still directly matable with the plug connector 5 by threadly engaging or disengaging the coupling nut on the plug connector 5 with its internal threads.

Figure 15:
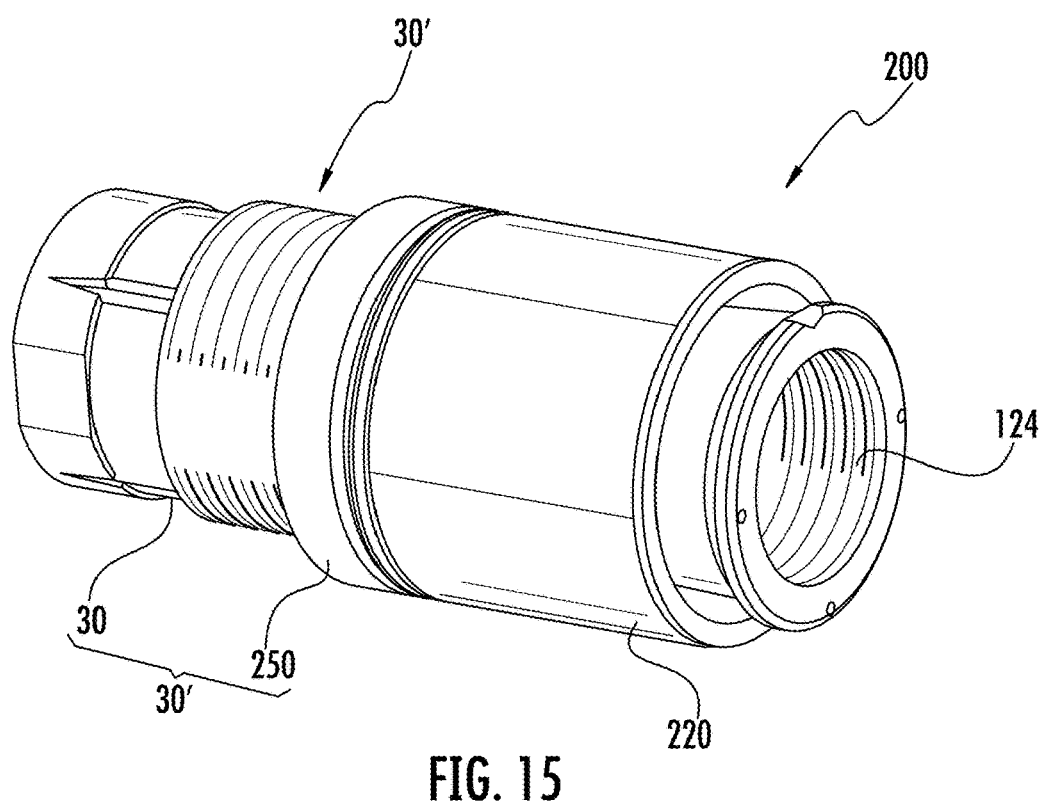
FIG. 15 is a perspective view showing the optical filter device of FIG. 9 attached to the retro-fitted receptacle of FIG. 14 having the external coupling device secured with the threaded collar of the optical filter device.
Figure 16:
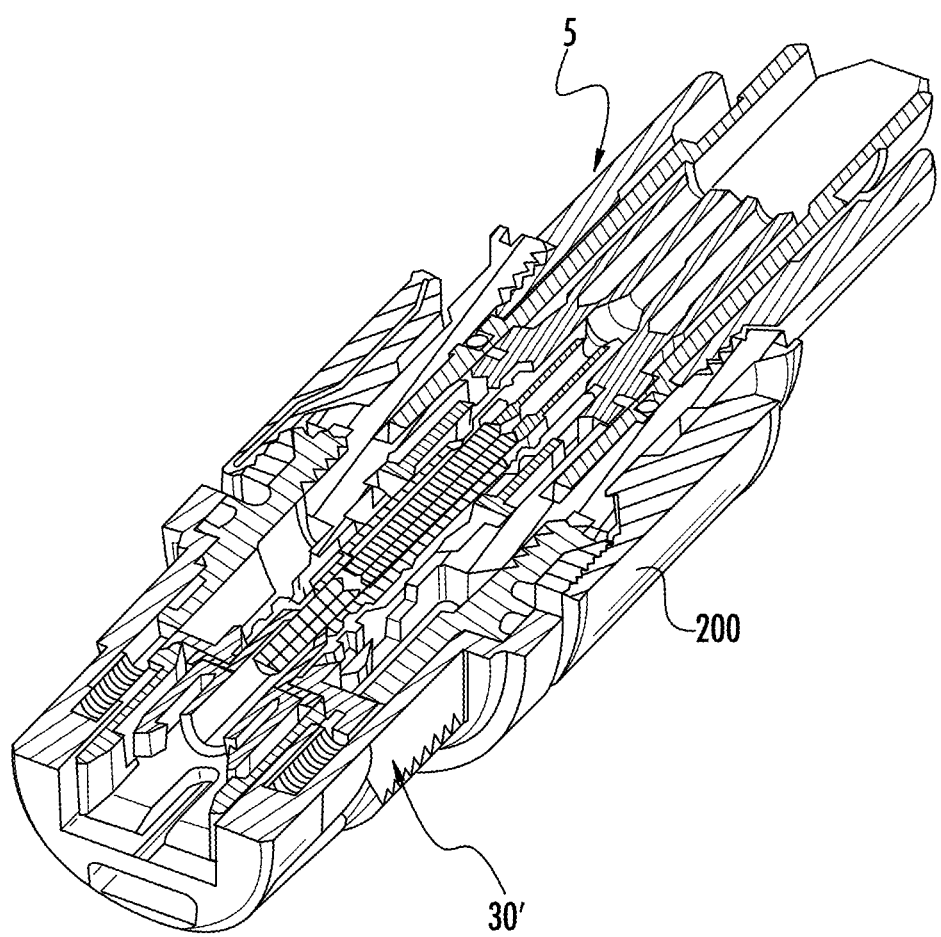
FIG. 16 is a cross-sectional view depicting the connector of FIG. 10 secured to the optical filter device and receptacle of FIG. 15 and creating an optical pathway between the devices.

FIG. 15 is a perspective view showing the optical filter device 200 attached to the retro-fitted receptacle 30' of FIG. 14. FIG. 16 is a cross-sectional view depicting the mating among the plug connector secured to the receptacle end of optical filter device 200 and the plug end of device 200 being attached to receptacle 30' for creating an optical pathway between the devices.

Figure 17:
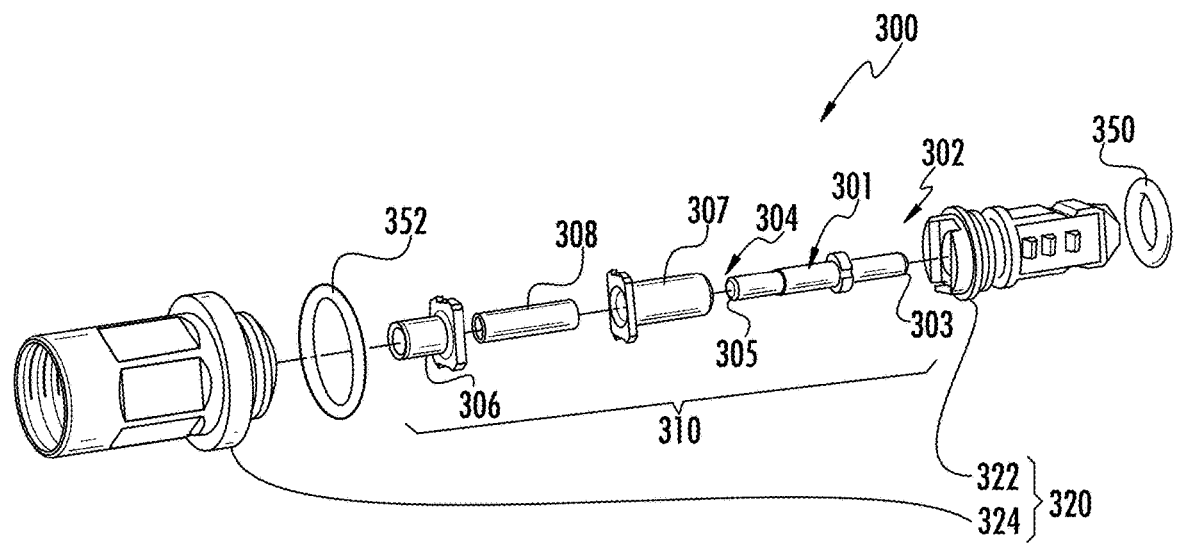
FIG. 17 is an exploded view of another optical filter device comprising an optical filter assembly and an housing.
Figure 18:
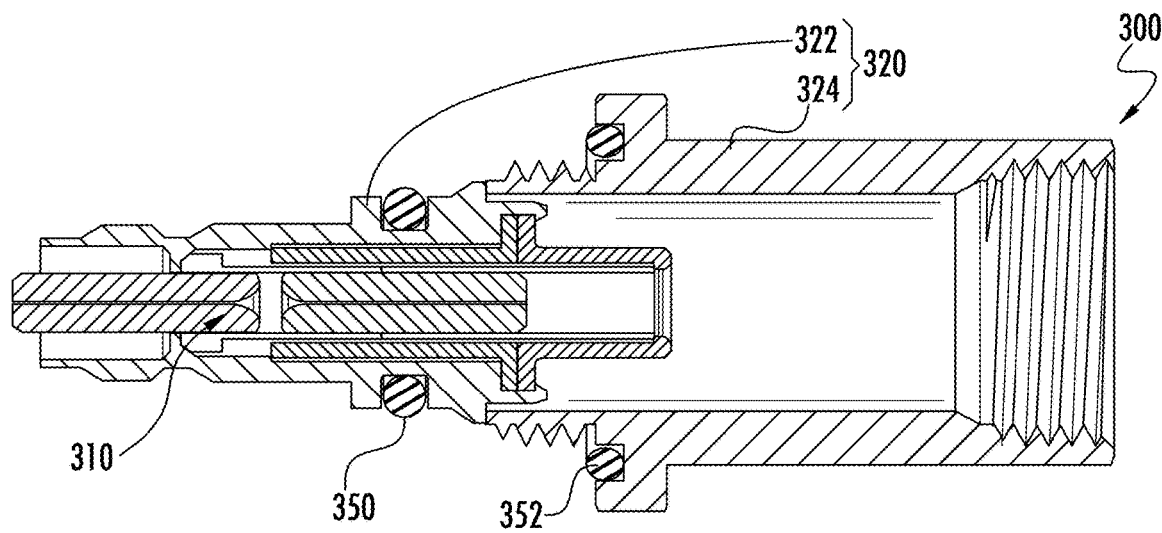
FIGS. 18 and 19 are assembled cross-sectional views of the optical filter device of FIG. 17.

Other concepts according to the concepts disclosed are possible. FIGS. 17-28 are directed to a third embodiment directed to optical filter device 300 for explaining further the concepts disclosed herein. Optical filter device 300 is similar to the other optical filter devices disclosed herein. As shown in FIG. 17, optical filter device 300 includes an optical filter assembly 310 and a housing 320. Housing 320 is formed form a plurality of components. Specifically, housing 320 comprises a plug end portion 322 having a plug end and a receptacle end portion 324 having a receptacle end with a passageway between the plug end and the receptacle end. Optical filter device 300 may also include one or more O-rings 350, 352 for sealing the device with complementary devices at a connection node.

As best shown in FIG. 17, optical filter assembly 310 comprises a ferrule assembly 301 with an optical waveguide that comprises a structure for reflecting one or more predetermined optical wavelengths as discussed herein. Ferrule assembly 301 comprises a first end 302 comprising a first ferrule end face 303 and a second end 304 comprising a second ferrule end face 305. Ferrule assembly 301 is at least partially disposed within a ferrule sleeve assembly (not numbered) comprising a first portion 306, a second portion 307 and a ferrule sleeve 308 such as depicted in cross-sectional view of FIG. 18.

Figure 19:
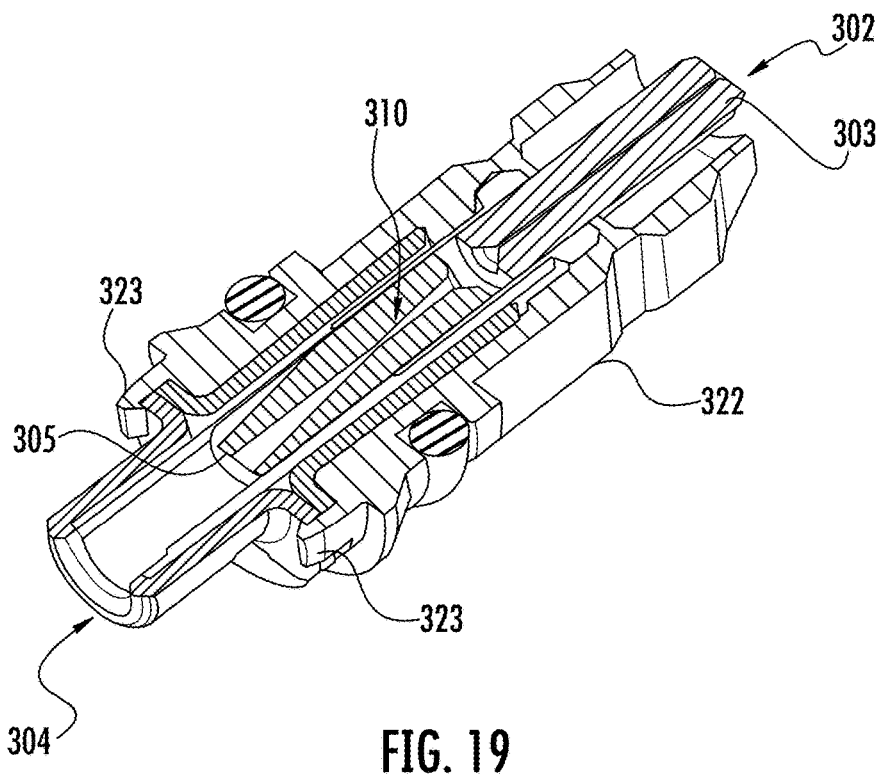
Figure 20:
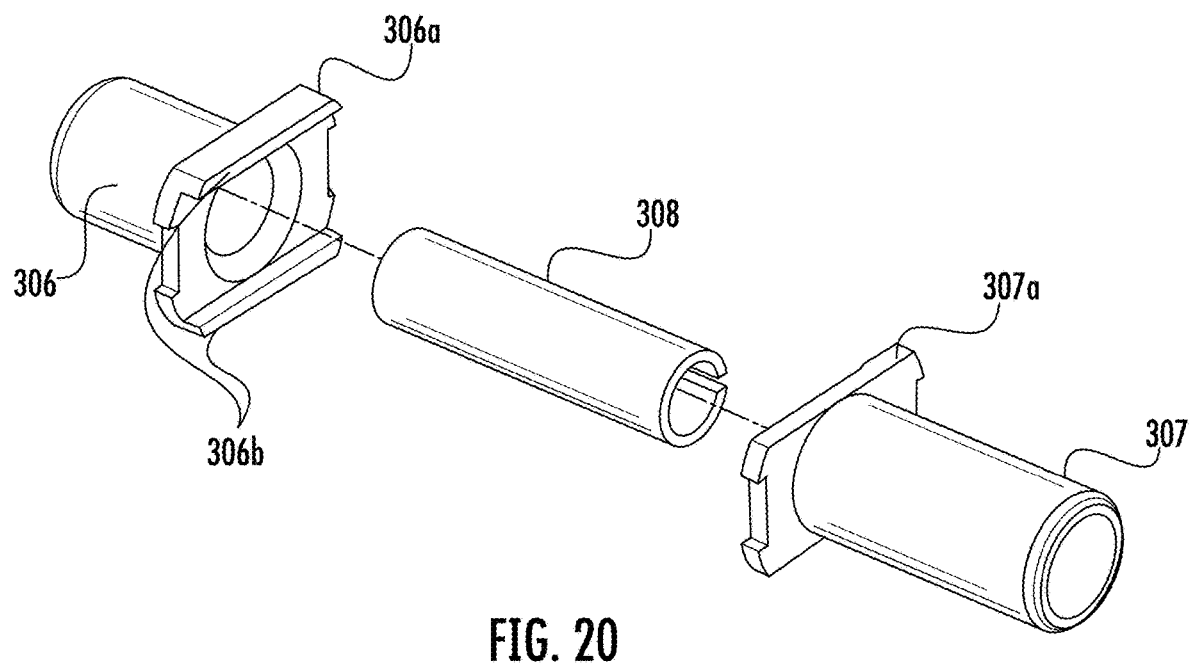
FIGS. 20 and 21 respectively are an exploded view and an assembled perspective view of the ferrule sleeve assembly of the optical filter device of FIG. 17.
Figure 21:
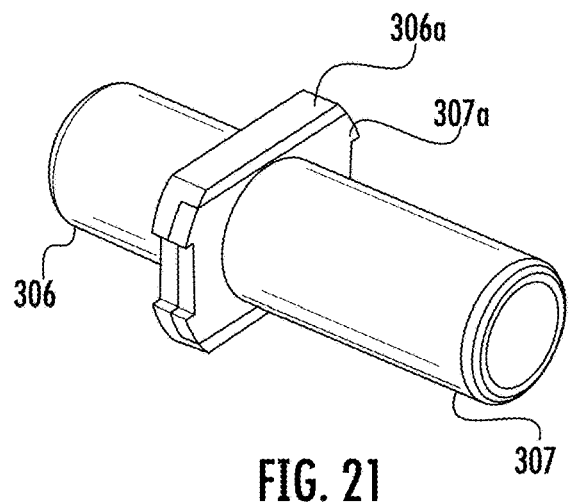
Figure 22:
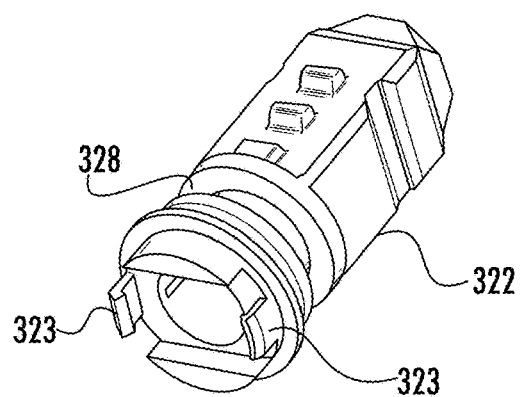
FIG. 22 is a perspective view of a receptacle end portion of the housing of the optical filter device of FIG. 17.

FIG. 19 is a partial assembled view showing the optical filter assembly 310 inserted into the plug end portion 322 of housing 320. As depicted, the ferrule sleeve assembly is secured to the plug end portion 322 of housing 320 by latching arms 323. FIGS. 20 and 21 respectively are an exploded view and an assembled perspective view of the ferrule sleeve assembly showing the first portion 306 and second portion 307 mated to together for securing the ferrule sleeve 308 in the passageway of the ferrule sleeve assembly. Specifically, first portion 306 has a flange 306a that cooperates with a flange 307a on second portion 307 of the ferrule sleeve assembly. More specifically, flange 306a has latching portions 306b disposed on opposing ends for snap-fitting with the flange 307a such as shown in FIG. 21, FIG. 22 is a perspective detailed view of the receptacle end portion 322 of housing 320. Receptacle end portion 322 comprises a groove 328 for receiving and seating O-ring 350.

Figure 23:
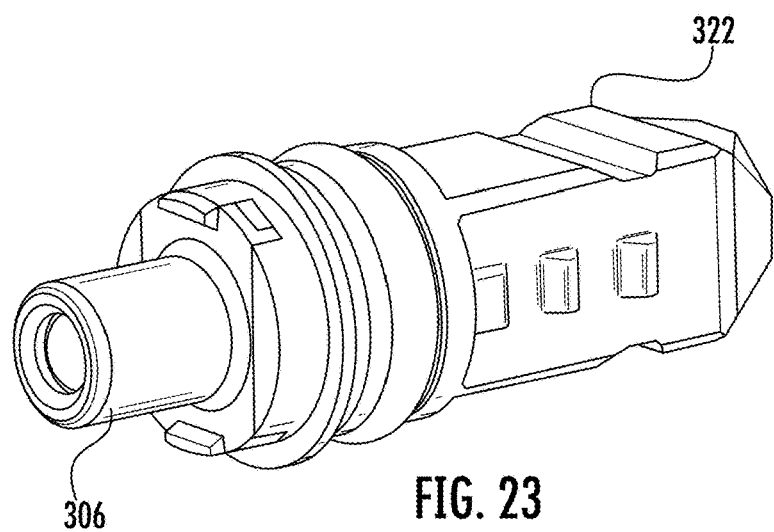
FIG. 23 is a perspective view of a receptacle end portion of the housing assembled with the optical filter assembly of the optical filter device of FIG. 17.

FIG. 23 is a perspective view of a receptacle end portion 322 of the housing assembled with the optical filter assembly 310. Thereafter, the assembly with the receptacle end portion 322 with the optical filter assembly 310 can be attached to the plug end portion 324 of the housing 320 to complete the assembly of optical filter device 300.

Figure 24:
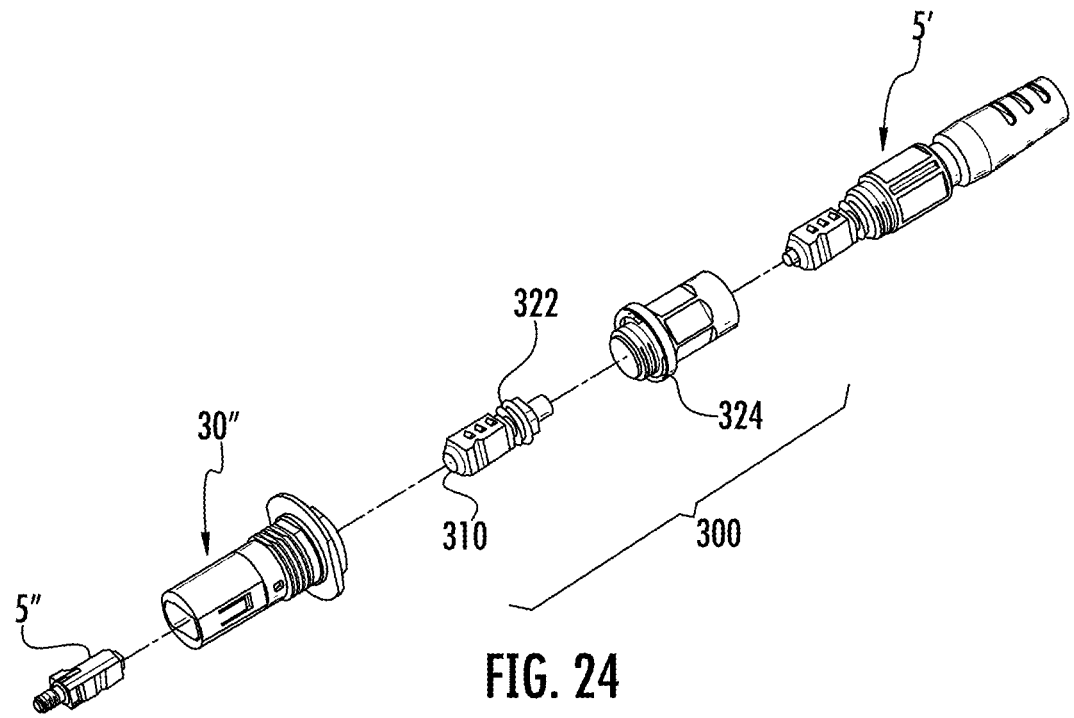
FIG. 24 shows an environmental perspective view of the optical filter device of FIG. 17 aligned for coupling between a connector being inserted from the right and being aligned for insertion to a receptacle on the left for creating a reflective event location in the optical network.

FIG. 24 shows an environmental partially exploded perspective view of the optical filter device 300 aligned for coupling between a connector 5' being inserted from the right and being aligned for insertion to a receptacle 30" on the left for creating a reflective event location at the connection node in the optical network.

Figure 25:
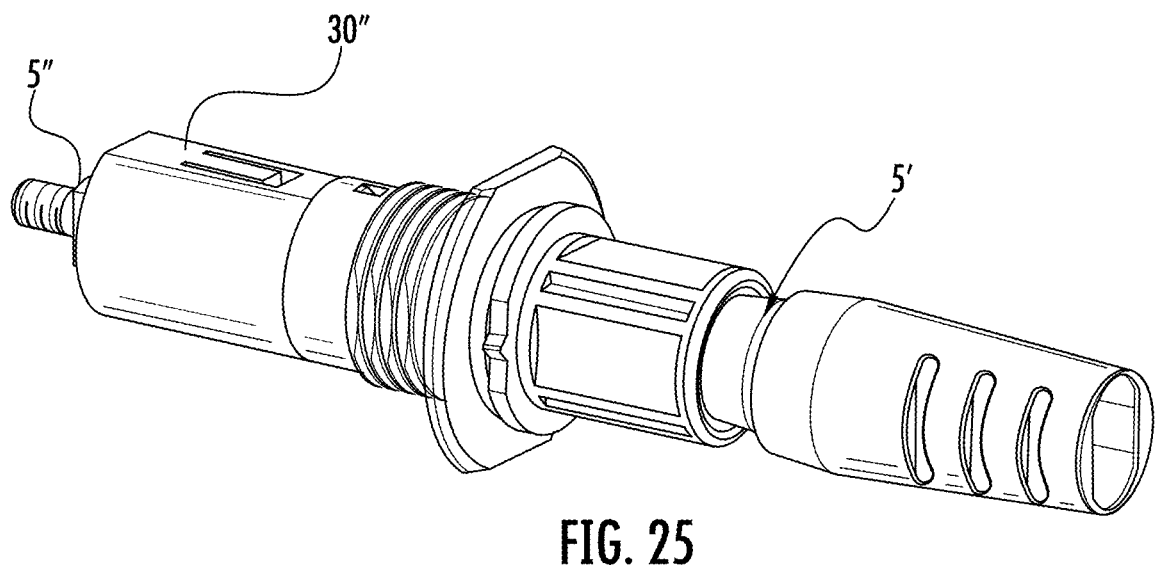
FIG. 25 is a perspective view of a connection node between a mated connector and a receptacle without an optical filter device.
Figure 26:
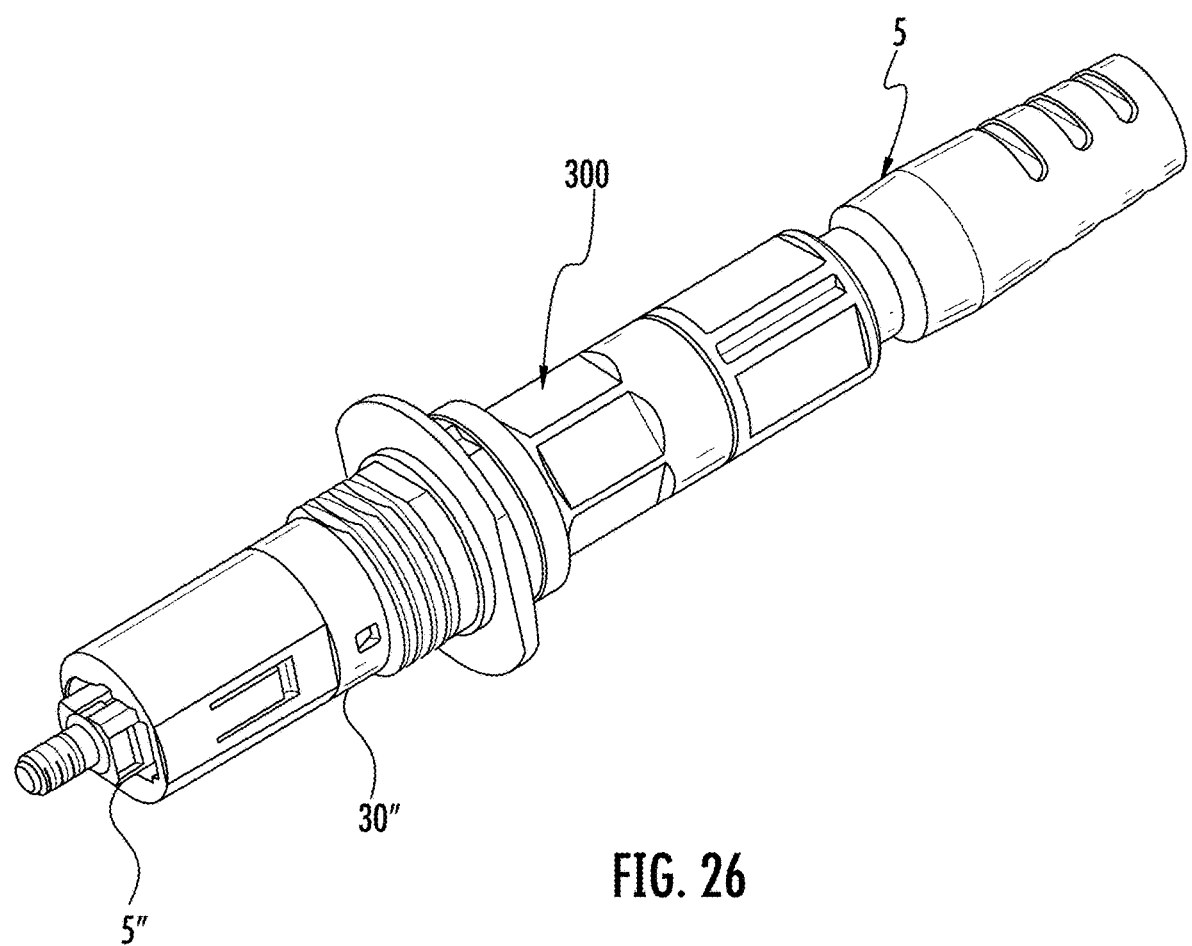
FIG. 26 is a perspective view of a connection node between a mated connector and a receptacle with the optical filter device of FIG. 17 disposed and mated between the connector and the receptacle.
Figure 27:
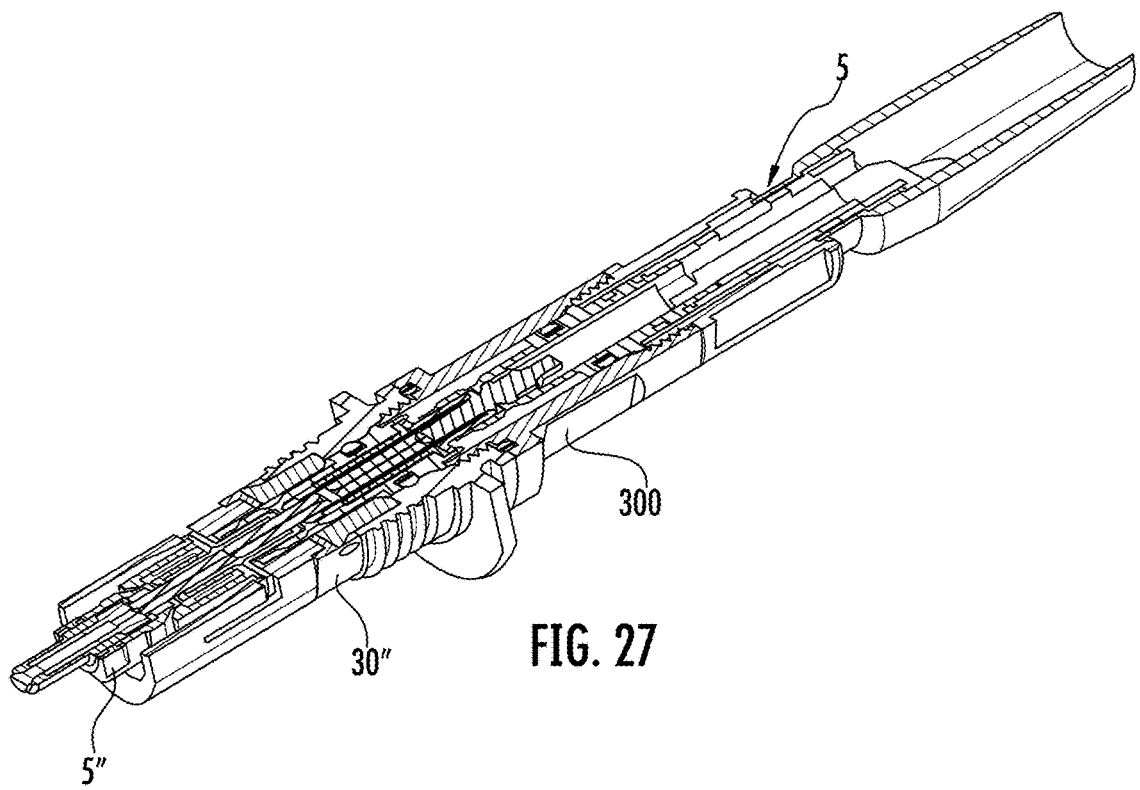
FIGS. 27 and 28 are cross-sectional views of the optical filter device mated with the connector and receptacle of FIG. 26.
Figure 28:
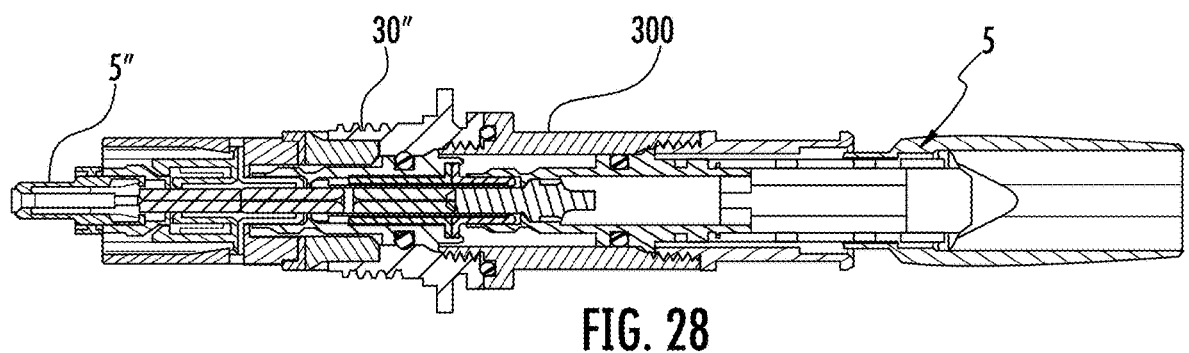

FIG. 25 depicts the optical connection directly between the connector 5' and receptacle 30". On the other hand, FIG. 26 depicts the connection node of FIG. 25 with the optical filter device 300 disposed and mated between connector 5' and receptacle 30" for making the optical connection with a reflective event characteristic. The concepts of an optical filter device for plugging into an optical network for creating a reflective event location may be embodied in many different fiber optic connector configurations. Although the concepts disclosed are for explanatory purposes and are suited for mating directly between a connector and receptacle, other types of fiber optic connectors are possible using the concepts disclosed herein.

In other embodiments, an optical filter assembly such as disclosed herein could be disposed with a closure or multi-part to create a reflective event location within the protective structure.

Generally speaking, outside of the optical filter assembly most of the components of optical filter devices may be formed from a suitable polymer, but other materials such as metal are possible. In one example; the polymer is a UV stabilized polymer such as ULTEM 2210 available from GE Plastics if the component is exposed to the elements; however, other suitable polymer materials are possible. For instance, stainless steel or any other suitable metal may be used for various components as desired.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An optical filter device, comprising:
   an optical filter assembly for reflecting one or more preselected wavelengths; and
   a housing comprising a plug end and a receptacle end, and a passageway between the plug end and the receptacle end, and the plug end comprises a shroud with a single fiber connector footprint and the receptacle end of the passageway comprises internal threads, wherein the at least a portion of the optical filter assembly is disposed within the passageway of the housing.

2. The optical filter device of claim 1, wherein the housing comprises a rim disposed between the plug end and the receptacle end, and a key is formed on the rim.

3. The optical filter device of claim 2, wherein the key comprises a protruding V-shape.

4. The optical filter device of claim 2, wherein the key is disposed on a side of the rim that is opposite a chamfered side of optical filter assembly.

5. The optical filter device of claim 1, wherein the housing is monolithically formed.

6. The optical filter device of claim 1, wherein the housing is formed from a plurality of components.

7. The optical filter device of claim 1, wherein the optical filter assembly has a first end and a second end, and wherein the first end has a first ferrule end face and the second end has a second ferrule end face and a latch structure.

8. The optical filter device of claim 7, wherein the first end has a SC connector footprint.

9. The optical filter device of claim 1, wherein the optical filter assembly comprises an optical waveguide having a Bragg grating.

10. The optical filter device of claim 1, wherein the housing has a length of 40 millimeters or less.

11. The optical filter device of claim 1, further comprising a dust cap.

12. The optical filter device of claim 1, wherein the single fiber connector footprint of the shroud has a SC connector footprint and the optical filter assembly has a first end that extends beyond the shroud.

13. The optical filter device of claim 1, further comprising a collar for engaging a rim of the optical filter device.

14. The optical filter device of claim 1, further comprising a two-piece threaded collar and a retention sleeve.

15. The optical filter device of claim 1, further comprising a receptacle mated to the plug end of the optical filter device.

16. The optical filter device of claim 1, further comprising a plug connector attached to the receptacle end of the housing.

17. The optical filter device of claim 1, further comprising one or more O-rings for sealing.

18. An optical filter device, comprising:
    an optical filter assembly for reflecting one or more preselected wavelengths, the optical filter assembly comprising a first end with a first ferrule end face and a second end with a second ferrule end face; and
    a housing comprising a plug end and a receptacle end, and a passageway between the plug end and the receptacle end, and the plug end comprises a shroud with a single fiber connector footprint and the receptacle end of the passageway comprises internal threads, wherein at least a portion of the optical filter assembly is disposed within the passageway of the housing and the first end of the optical filter assembly extends beyond the shroud.

19. The optical filter device of claim 18, wherein the second end of the optical filter assembly further comprises a latch structure.

20. The optical filter device of claim 18, wherein the housing comprises a rim disposed between the plug end and the receptacle end, and a key is formed on the rim.

21. The optical filter device of claim 20, wherein the key comprises a protruding V-shape.

22. The optical filter device of claim 20, wherein the key is disposed on a side of the rim that is opposite a chamfered side of optical filter assembly.

23. The optical filter device of claim 18, wherein the housing is monolithically formed.

24. The optical filter device of claim 18, wherein the housing is formed from a plurality of components.

25. The optical filter device of claim 18, wherein the first end of the optical filter assembly has a SC connector footprint.

26. The optical filter device of claim 18, wherein the optical filter assembly comprises an optical waveguide having a Bragg grating.

27. The optical filter device of claim 18, wherein the housing has a length of 40 millimeters or less.

28. The optical filter device of claim 18, further comprising a dust cap.

29. The optical filter device of claim 18, wherein the single fiber connector footprint of the shroud has a SC connector footprint.

30. The optical filter device of claim 18, further comprising a collar for engaging a rim of the optical filter device.

31. The optical filter device of claim 18, further comprising a two-piece threaded collar and a retention sleeve.

32. The optical filter device of claim 18, further comprising a receptacle mated to the plug end of the optical filter device.

33. The optical filter device of claim 18, further comprising a plug connector attached to the receptacle end of the housing.

* * * * *